United States Patent [19]

Swank

[11] Patent Number: 5,606,377
[45] Date of Patent: Feb. 25, 1997

[54] CRT HAVING AN IMPLOSION PROTECTION BAND WITH BRACKETS

[75] Inventor: Harry R. Swank, Lancaster, Pa.

[73] Assignee: Thomson Consumer Electronics, Inc., Indianapolis, Ind.

[21] Appl. No.: 541,990

[22] Filed: Oct. 10, 1995

[51] Int. Cl.$^6$ .......................... H04N 5/65; H04N 5/645; H04N 5/68; H01J 29/80

[52] U.S. Cl. .......................... 348/821; 348/822; 348/823; 348/824; 348/825; 348/805; 313/364; 313/402; 313/404; 313/407; 313/477 R; 313/482; 248/231.81; 248/230.7; 248/316.7; 248/229.16

[58] Field of Search .................... 348/821, 822, 348/824, 823, 825, 805; 313/364, 402, 404, 407, 477 R, 482; 248/231.81, 230.7, 316.7, 229.16

[56] References Cited

U.S. PATENT DOCUMENTS

| | | | |
|---|---|---|---|
| 3,317,172 | 5/1967 | Balint | 248/316 |
| 3,512,674 | 5/1970 | Wittenbecher | 320/2.1 |
| 4,360,837 | 11/1982 | Kreidler et al. | 358/246 |
| 5,347,367 | 9/1994 | Swank et al. | 348/822 |

*Primary Examiner*—Edward L. Coles, Sr.
*Assistant Examiner*—Tia M. Harris
*Attorney, Agent, or Firm*—Joseph S. Tripoli; Dennis H. Irlbeck; Vincent J. Coughlin, Jr.

[57] ABSTRACT

The invention relates to an implosion protection band 26, 126 for a CRT having a plurality of brackets 40, 70, 140 that are disposed between the band and a sidewall 3 of the CRT 1 and detachably attached to the implosion protection band to support either a degaussing coil 9 or to facilitate mounting the CRT within a receiver.

16 Claims, 4 Drawing Sheets

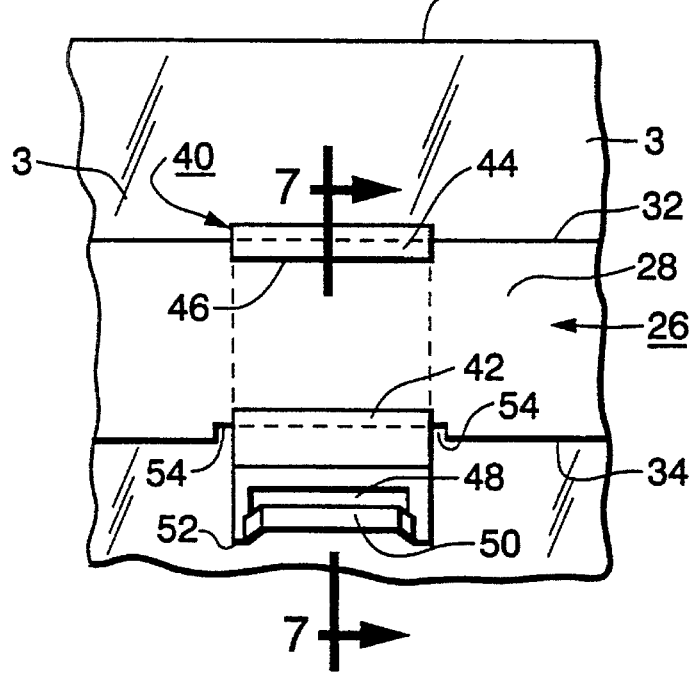
Fig. 6
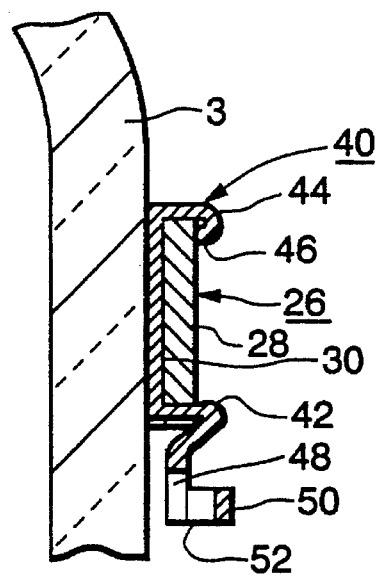
Fig. 7
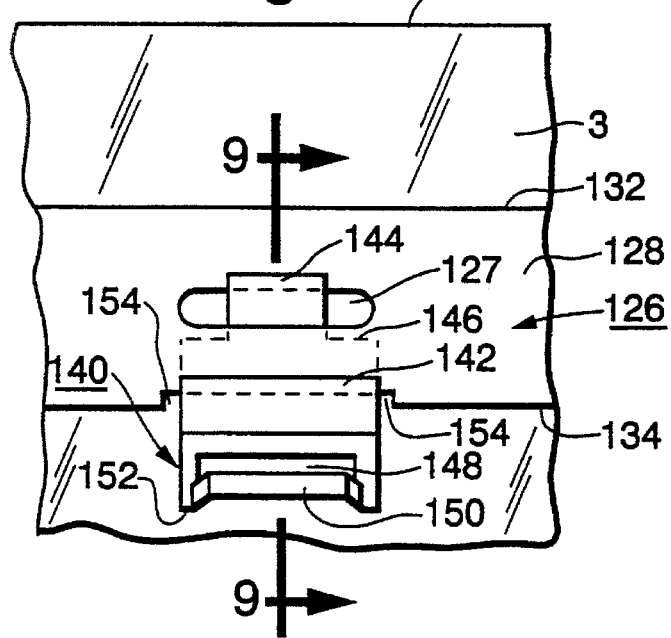
Fig. 8
Fig. 9

CRT HAVING AN IMPLOSION PROTECTION BAND WITH BRACKETS

The invention relates generally to implosion protection means for a cathode-ray tube (CRT) and, more particularly, to an implosion protection band having a plurality of brackets disposed between the band and a sidewall of a faceplate panel of the CRT.

BACKGROUND OF THE INVENTION

A CRT is evacuated to a very low pressure and accordingly is subject to the possibility of implosion due to the stresses produced by atmospheric pressure acting on all surfaces of the CRT. This problem has been addressed in the art by providing the CRT with an implosion protection band. Such a band is used to apply compressive force to the sidewall of a faceplate panel of the CRT to redistribute some of the forces. The redistribution of forces decreases the probability of a spontaneous implosion of the tube by minimizing tension in the corners of the panel. An implosion protection band also is beneficial because it improves the impact resistance of the tube. Glass in compression is stronger than glass which is in tension, and the band causes compression in panel areas which otherwise would be in tension. The implosion protection band also provides a convenient structure on which to attach a degaussing coil that is used to re-magnetize internal ferromagnetic components of the CRT and mounting lugs to secure the CRT within a cabinet or receiver.

It is known that the magnetic field of the earth affects the paths of the three electron beams emitted by a CRT electron gun and may cause what is called "misregister" in a color CRT. A color selection electrode, such as a shadow mask, having a multiplicity of openings therethrough, is located in proximity to a tricolor screen of the tube to assure that each of the three electron beams impacts the phosphor elements of the proper light emitting color. Thus, for example, the electron beam which is modulated with red information impacts the phosphor elements that emit red light. Because the electrons of the beams are charged particles, the earth's magnetic field has an influence on their trajectories which can cause the electrons to impact a phosphor of the improper color, causing misregister, thereby degrading the quality of the image display. For this reason, a magnetic shield, preferably an internal magnetic shield, or IMS, is used within the CRT to act in conjunction with the shadow mask and its frame to shield a substantial portion of the electron beams trajectories from the influence of the earth's magnetic field.

The shielding acts in the following way: the external magnetic field realigns the Weiss domains in the ferromagnetic material of the shadow mask, mask frame and IMS, creating an induced magnetic field that tends to oppose the action of the external field of the earth which has given rise to it. If the material of the ferromagnetic components, i.e., of the shadow mask, mask frame and the IMS, has high magnetic permeability, the induced field at least partially opposes the external field. Hence, the deleterious effect of the earth's magnetic field is reduced.

For more efficient compensation, the ferromagnetic material of the components has to be de-magnetized with a magnetic field that is provided by the degaussing coil, fixed by appropriate means to the rear of the tube and overlying the ferromagnetic components. One such arrangement is shown in FIGS. 1 and 2, in which a CRT 1 comprises a glass envelope having a faceplate panel 2 with a sidewall 3 and a funnel 4 which includes an neck. The sidewall 3 of the panel 2 is attached to the funnel 4 by a frit seal 5. An implosion protection band 6, for example a shrinkfit band, surrounds at least a portion of the sidewall 3 of the panel 2. The band 6 has four mounting lugs 7 located at the corners of the tube to provide a means to affix the tube within a receiver (not shown). A deflection yoke 8 is attached to the funnel 4 of the tube to deflect the electron beams from the electron gun (also not shown) that is located in the neck of the tube. A degaussing coil 9 having two loops 10 and 11 is fixed by appropriate means to the external rear surface of the tube 1. In FIGS. 1 and 2, the coil 9 is looped over the mounting lugs 7 and secured by means of a pair of holding straps 12. Alternatively, as shown, in FIGS. 3 and 4, the coil 9 may be secured to the band 6 by means of the straps 12 or by coil hangers 13 attached to retainers 14 adjacent to openings 15 formed near an edge of the band. The openings 15 are formed by either stamping or piercing the material of the band, as is known in the art. The retainers 14 are then bent out of the plane of the band to accommodate the coil hangers 13.

Possible drawbacks of looping the degaussing coil over the mounting lugs 7 in the manner shown in FIGS. 1 and 2 is that the coil may not be accurately positioned on the tube, or that its position on the lugs may interfere with the attachment of the tube within the receiver.

One drawback of forming the openings 15 in the band 6, for attaching the degaussing coil 9 by means of either the straps 12 or the coil hangers 13, is that the stamping and subsequent forming operations frequently causes burrs, or sharp projections, to be formed on the band adjacent to the openings. Burrs are undesirable because they can either cut the insulation on the degaussing coil 9 or injure anyone handling the tube. Because of the size of the bands and the relative fragility of the retainers 14, any removal of the burrs must be done by hand. This adds substantial labor cost to the price of the bands. Additionally, it is difficult to accurately form and locate the retainers 14 on the band. Also, bands with formed retainers pose shipping and handling problems, because special packing and handling precautions are required to prevent damage or distortion of the retainers. Despite the use of protective coatings on the bands to prevent rust, the stamping and retainer-forming operations expose the underlying ferromagnetic material of the band to the atmosphere, thus providing sites where rust may form. Rust is not only cosmetically undesirable but also may be a source of defects in subsequently applied faceplate coatings, which are formed by spraying suitable materials onto the viewing faceplate and adjacent portions of the panel sidewall, including the band, of evacuated CRT's.

Thus, it is desirable to provide attachment means for use with an implosion protection band that have none of the shortcomings or drawbacks of the prior art. Additionally, an implosion protection band made without formed retainers therein may utilize narrower material and is, therefore, inherently less expensive than a conventional band with formed retainers.

SUMMARY OF THE INVENTION

A cathode-ray tube comprises an evacuated envelope having a faceplate panel with a sidewall joined to a funnel. An implosion protection band surrounds at least a portion of the sidewall and is in contact therewith. A plurality of brackets is disposed between the implosion protection band and the sidewall of the panel. Each of the brackets has an opening therethrough and is detachably attached to the implosion protection band by a resilient clip at one end thereof which overlaps at least a portion of the implosion protection band.

BRIEF DESCRIPTION OF THE DRAWINGS

The invention will now be described in greater detail, with relation to the accompanying drawings, in which:

FIG. 6 is a top view of an implosion protection band and a first embodiment of a degaussing coil-supporting bracket according to the present invention;

FIG. 7 is a sectional view taken along line 7—7 of FIG. 6;

FIG. 8 is a top view of an implosion protection band and a second embodiment of a degaussing coil-supporting bracket according to the present invention;

FIG. 9 is a sectional view taken along line 9—9 of FIG. 8;

DETAILED DESCRIPTION OF THE PREFERRED EMBODIMENTS

Figure 1:
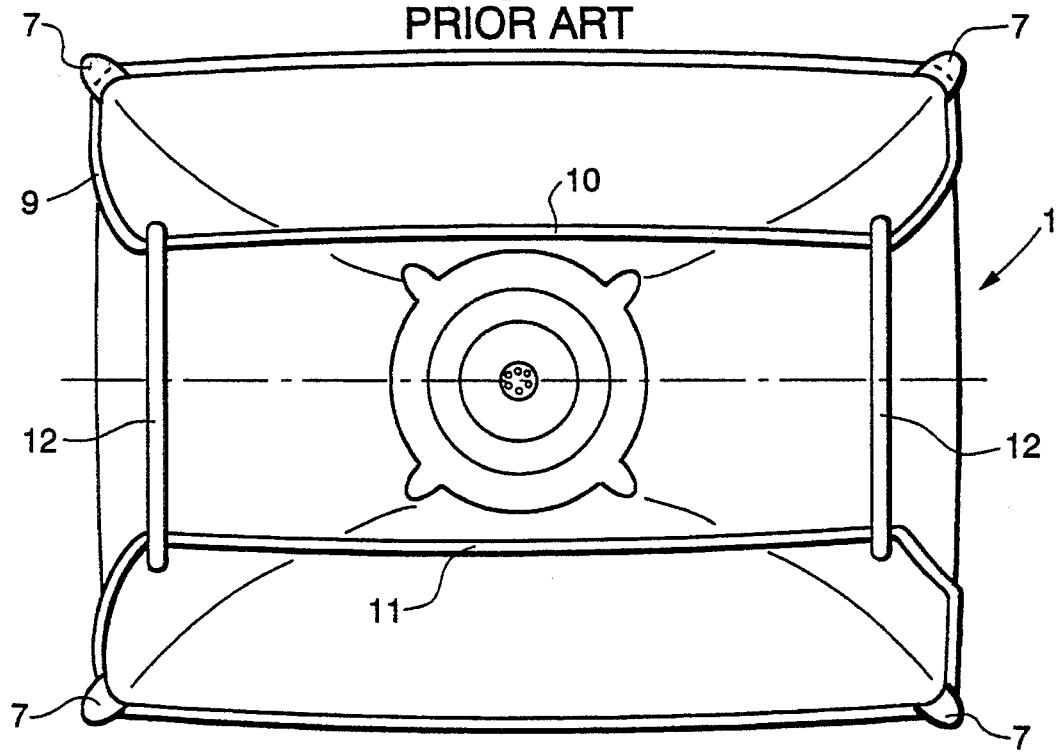
FIG. 1 is rear view of a CRT showing a prior art implosion protection band with degaussing coil held in position on the CRT by mounting lugs and straps.
Figure 2:
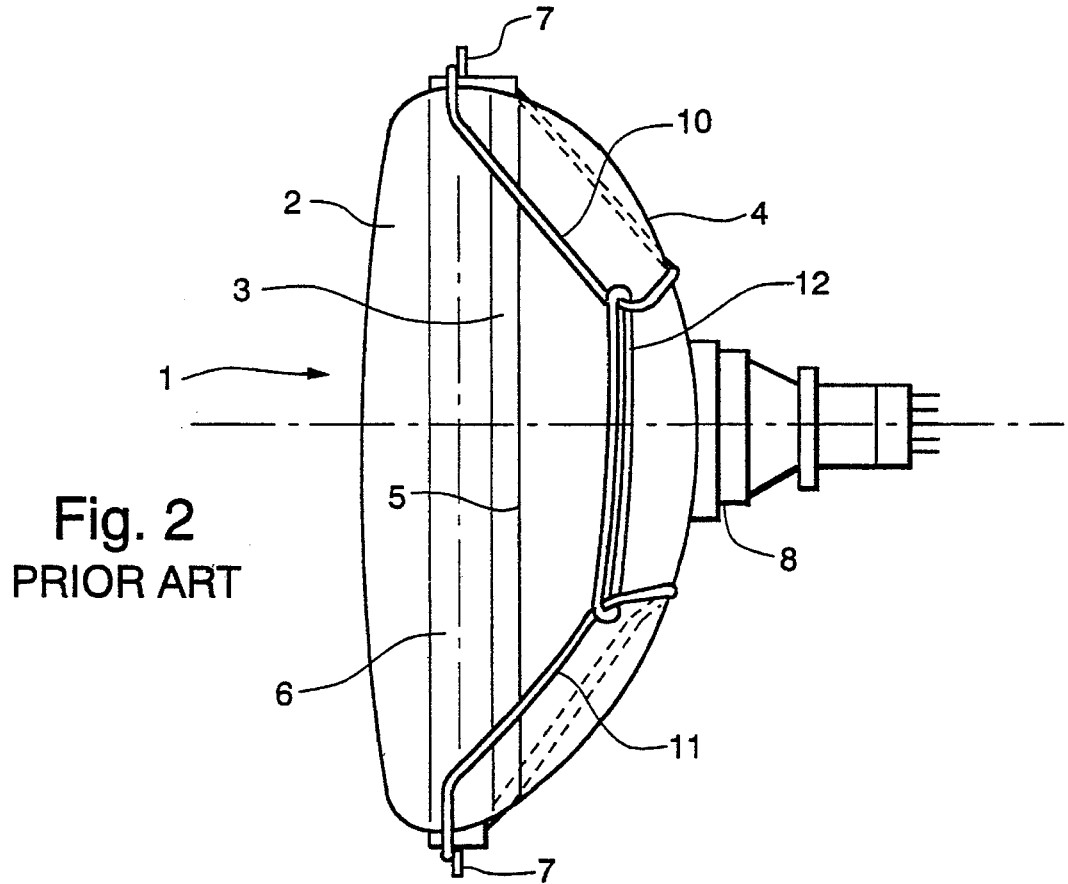
FIG. 2 is a side view of the CRT, band and degaussing coil of FIG. 1.
Figure 3:
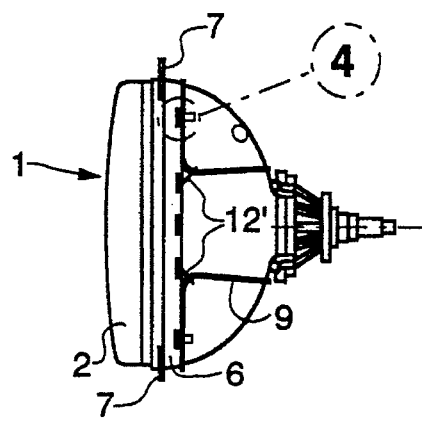
FIG. 3 shows a CRT with a degaussing coil conventionally attached to a prior art implosion protection band.
Figure 5:
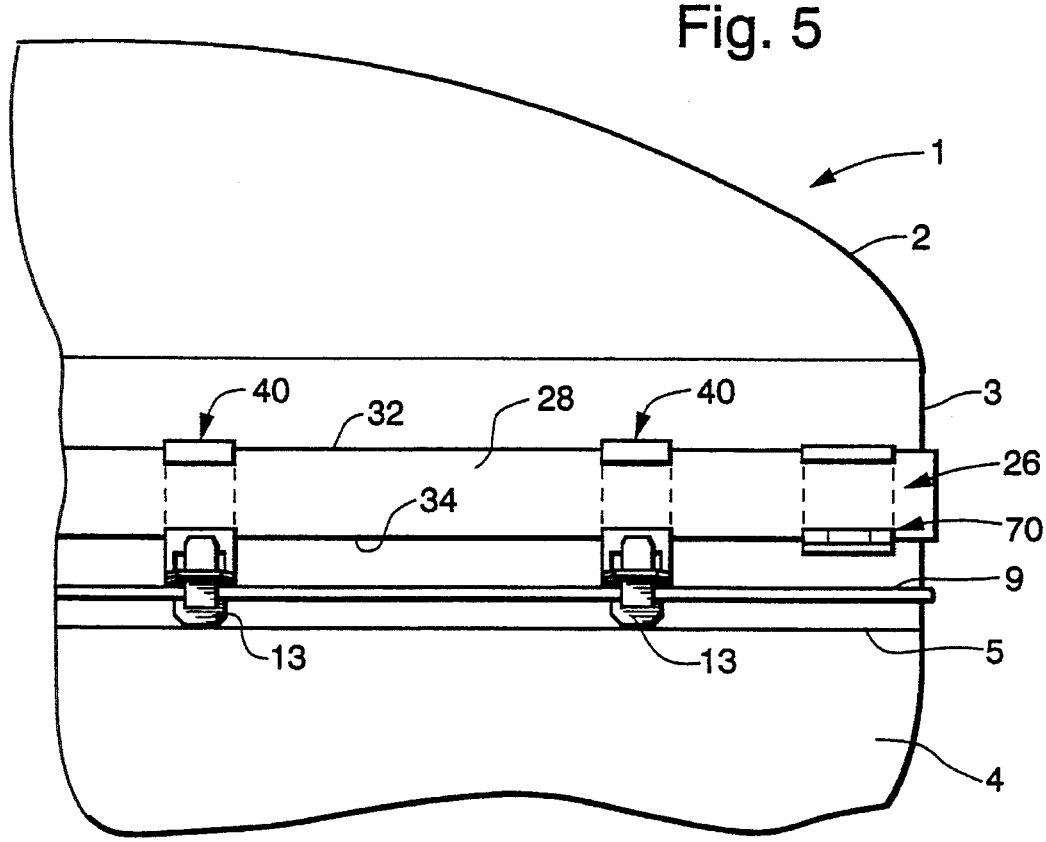
FIG. 5 shows a portion of a CRT according to the present invention.

With reference to FIGS. 5—7, the faceplate panel 2 and the sidewall 3 of the CRT 1 are identical to those described with respect to FIG. 2. Preferably, the implosion protection band 26 is a shrinkfit band with cold dimensions slightly smaller than the periphery of the sidewall 3 of the faceplate panel 2. Typically, the band 26 is formed of a ferrous metal, such as carbon steel or an alloy thereof, and is coated with one of more layers of corrosion inhibiting material, as described in U.S. Pat. No. 5,241,394, issued to Mutso et al. on Aug. 31, 1993. The shrinkfit band 26 is formed from at least one steel strip which is joined at the ends (not shown) to form a loop. The band 26 is fitted around the panel 2 by heating the band within the range of 300° to 500° C., causing it to expand, and then allowing it to cool and contact the sidewall 3 of the panel. The tension of the cooled band 26 applies a compressive force to the panel. The band 26 has a first surface 28, an oppositely disposed second surface 30 (shown in FIG. 7), a from edge 32 and a rear edge 34. Alternatively, the band may be a conventional tension band, the ends of which are held by a crimped closure (not shown).

Figure 4:
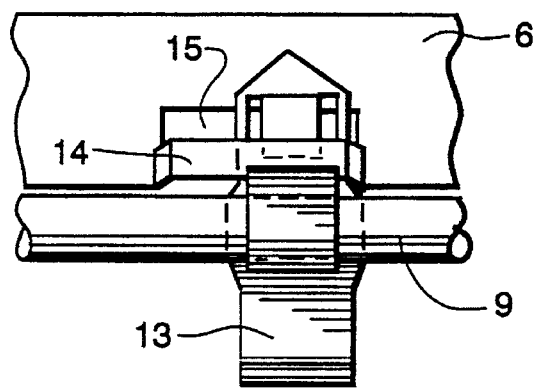
FIG. 4 shows an enlargement of the attachment means within circle 4 of FIG. 3.

To facilitate attachment of the degaussing coil 9 to the CRT, a plurality of novel degaussing coil-supporting brackets 40 are disposed between the band 26 and the sidewall 3 of the panel 2. A coil hanger 13, of the type shown in FIGS. 4 and 5, is secured to each of the coil-supporting brackets 40. The coil-supporting bracket 40, shown in detail in FIGS. 6 and 7, includes a resilient clip 42 which overlaps the rear edge 34 of the band 26 and contacts at least a portion of the first surface 28 to detachably attach the coil-supporting bracket to the band 26. A band-contacting tab 44 is provided at a leading edge 46 of the coil-supporting bracket 40, opposite the clip 42. The tab 44 abuts and, preferably, overlies the front edge 32 of the band 26. The tab 44 also may contact the first surface 28 of the band 26. An opening 48 is formed by conventionally piercing or stamping through the coil-supporting bracket 40 adjacent to the resilient clip 42. A retainer 50 is provided between the opening 48 and a terminal edge 52 of the coil-supporting bracket 40. The retainer 50 is raised out of the plane of the coil-supporting bracket 40 to secure the coil hanger 13. A recess 54 may be formed in at least one edge of the band 26, for example in the rear edge 34, to laterally locate each of the brackets 40.

A second embodiment of the novel coil-supporting bracket 140 is shown in FIGS. 8 and 9. Each coil-supporting bracket 140 is disposed between a shrinkfit implosion protection band 126 and the sidewall 3 of the panel 2. The band 126 has a first surface 128, an oppositely disposed second surface 130 (shown in FIG. 9), a front edge 132 and a rear edge 134. The shrinkfit implosion protection band 126 differs from the band 26 by the inclusion of plurality of bracket-locating slot 127, one of which is shown in FIGS. 8 and 9, formed through the body of the band from the first surface 128 to the second surface 130. The band 126 also is formed of a ferrous metal, such as carbon steel or an alloy thereof, and is coated with one of more layers of corrosion inhibiting material. Each coil-supporting bracket 140 includes a resilient clip 142 which overlaps the rear edge 134 of the band 126 and contacts at least a portion of the first surface 128, to detachably attach the coil-supporting bracket to the band 126. A band-contacting tab 144 is provided at a leading edge 146 of the bracket 140 opposite the clip 142. The tab 144 is configured to extend through the bracket-locating slot 127. The tab 144 also may contact the first surface 128 of the band 126. An opening 148 is formed by conventionally piercing or stamping through the coil-supporting bracket 140 adjacent to the resilient clip 142. A retainer 150 is provided between the opening 148 and a terminal edge 152 of the coil-supporting bracket 140. The retainer 150 is raised out of the plane of the bracket 140 to secure a coil hanger 13 of the type shown in FIGS. 4 and 5. A plurality of recesses 154, only one of which is shown, may be formed in at least one edge of the band 126, for example in the rear edge 134, to laterally locate each of the coil-supporting brackets 140.

The coil-supporting brackets 40 and 140 are preferably formed of aluminum stock so that rust will not occur. Additionally, because the coil-supporting brackets 40, 140 are manufactured as separate pieces, they can be deburred by convention means, such as tumbling—a process that could not be used when the brackets were formed integral with the implosion protection band. Also, the brackets 40, 140 can be economically packaged to protect them from being bent or otherwise damaged in shipment and handling. Preferably, the coil-supporting brackets 40 and 140 are formed from 0.51 mm (0.020 mil) thick material.

Figure 10:
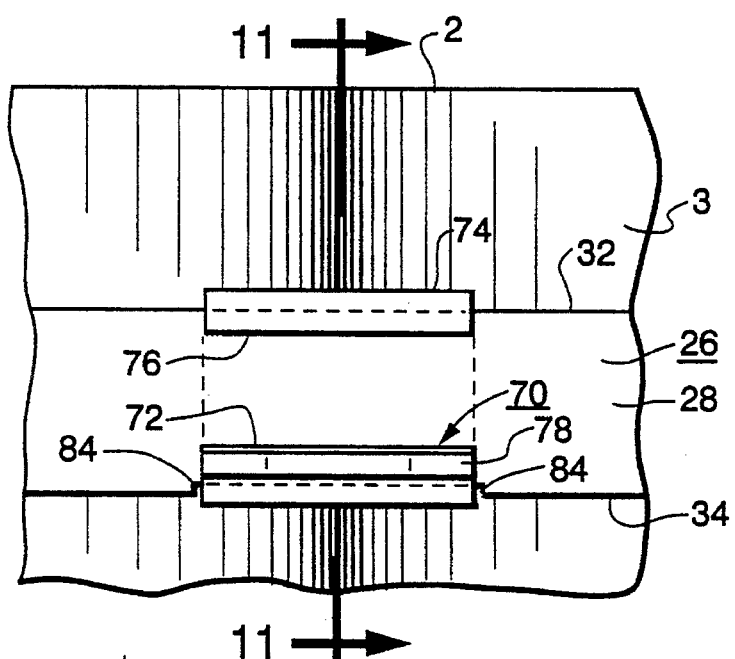
FIG. 10 is a top view of an implosion protection band and a mounting bracket according to the present invention.
Figure 11:
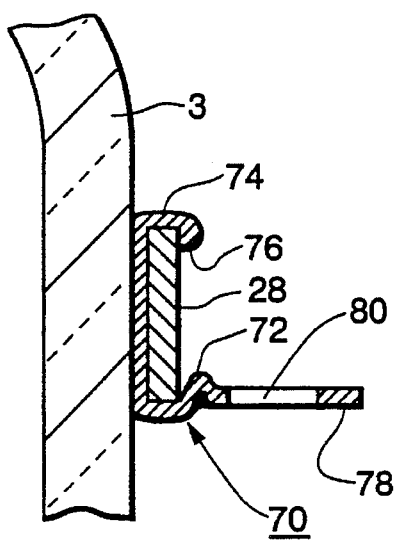
FIG. 11 is a sectional view taken along line 11—11 of FIG. 10.
Figure 12:
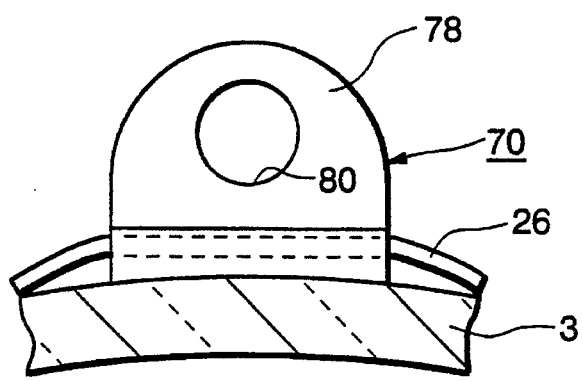
FIG. 12 is a rear view taken along line 12—12 of FIG. 10.

The present invention is not limited to coil-supporting brackets on which the degaussing coil 9 is suspended. As shown in FIGS. 5 and 10–12, a similar structure may be utilized to provide tube-mounting brackets that may be located either in proximity to the four corners of a rectangular CRT, as shown in FIG. 5, or at the rounded corners of a CRT, as shown in FIG. 10–12, to support the CRT within a receiver, not shown. The tube-mounting brackets 70 preferably are formed of aluminum stock having a thickness of 2.3 mm (0.09 mils). Each tube-mounting bracket 70, shown in detail in FIGS. 10–12, includes a resilient clip 72 which overlaps the rear edge 34 of the band 26 and contacts at least a portion of the first surface 28 to detachably attach the tube-mounting bracket to the band 26. A band-contacting tab 74 is provided at a leading edge 76 of the tube-mounting bracket 70 opposite the clip 72. The tab 74 abuts and, preferably, overlies the front edge 32 of the band 26. The tab 74 also may contact the first surface 28 of the band 26. A lug 78 extends normal to the resilient clip 72 and has a lug aperture 80 therethrough to facilitate supporting the CRT within the receiver. A plurality of recesses 84, only one of which is shown, may be formed in at least one edge of the band 26, for example in the rear edge 34, to laterally locate each of the mounting brackets 70.

What is claimed is:

1. In a cathode-ray tube comprising an evacuated envelope having a faceplate panel with a sidewall joined to a funnel and an implosion protection band surrounding at least a portion of said sidewall and in contact therewith, a plurality of brackets being disposed between said implosion protection band and said sidewall of said panel, each of said brackets having an opening therethrough, the improvement wherein each of said brackets being detachably attached to said implosion protection band by a resilient clip at one end thereof which overlaps at least a portion of said band.

2. The tube as described in claim 1, wherein each of said brackets further includes a band-contacting tab at an end opposite said resilient clip.

3. The tube as described in claim 2, wherein said band-contacting tab abuts an edge of said band.

4. The tube as described in claim 2, wherein said band-contacting tab overlies said edge of said band.

5. The tube as described in claim 1, wherein said implosion protection band is a shrinkfit band and a plurality of recesses are formed around at least one edge thereof to laterally locate each of said brackets around the periphery of said sidewall of said panel.

6. The tube as described in claim 1, wherein said implosion protection band is a shrinkfit band and a plurality of bracket-locating slots are formed through said shrinkfit band, each of said brackets having a band-contacting tab on an end opposite said resilient clip, said band-contacting tab of each of said brackets extending through a different one of said bracket-locating slots.

7. The tube as described in claim 1, wherein said brackets further include an opening and a retainer between said resilient clip and a terminal edge of said brackets.

8. The tube as described in claim 1, wherein said brackets further include a lug extending normal to said resilient clip, said lug having an aperture therethrough.

9. In a cathode-ray tube comprising an evacuated envelope having a faceplate panel with a sidewall joined to a funnel and a shrinkfit implosion protection band with cold dimensions slightly smaller than the periphery of said panel surrounding at least a portion of said sidewall and is in contact therewith, a plurality of brackets being disposed between said shrinkfit implosion protection band and said sidewall of said panel, each of said brackets having an opening therethrough, the improvement wherein each of said brackets being detachably attached to said shrinkfit implosion protection band by a resilient clip at one end thereof which overlaps at least a portion of said shrinkfit band.

10. The tube as described in claim 9, wherein each of said brackets further includes a band-contacting tab at an end opposite said resilient clip.

11. The tube as described in claim 10, wherein said band-contacting tab abuts an edge of said shrinkfit band.

12. The tube as described in claim 10, wherein said band-contacting tab overlies said edge of said shrinkfit band.

13. The tube as described in claim 9, wherein a plurality of bracket-locating slots are formed through said shrinkfit band, each of said brackets having a band-contacting tab on an end opposite said resilient clip, said band-contacting tab of each of said brackets extending through a different one of said bracket-locating slots.

14. The tube as described in claim 9, wherein a plurality of recesses are formed around at least one edge of said shrinkfit band to laterally locate each of said brackets around the periphery of said sidewall of said panel.

15. The tube as described in claim 9, wherein said brackets further include an opening and a retainer between said resilient clip and a terminal edge of said brackets.

16. The tube as described in claim 9, wherein said brackets further include a lug extending normal to said resilient clip, said lug having an aperture therethrough.

* * * * *